United States Patent [19]

Abe

[11] Patent Number: 4,873,958
[45] Date of Patent: Oct. 17, 1989

[54] ENGINE IGNITION TIMING CONTROL SYSTEM

[75] Inventor: Kunihiro Abe, Higashimurayama, Japan

[73] Assignee: Fuji Jukogyo Kabushiki Kaisha, Tokyo, Japan

[21] Appl. No.: 234,687

[22] Filed: Aug. 22, 1988

[30] Foreign Application Priority Data

Aug. 28, 1987 [JP] Japan .................................. 62-215978

[51] Int. Cl.<sup>4</sup> .......................... F02P 5/15; F02P 11/00
[52] U.S. Cl. ..................................... 123/424; 123/414
[58] Field of Search ................ 123/179 BG, 414, 424

[56] References Cited

U.S. PATENT DOCUMENTS

| 4,359,988 | 11/1982 | Matsubara | 123/424 |
| 4,615,318 | 10/1986 | Imoto et al. | 123/414 |
| 4,664,082 | 5/1987 | Suzuki | 123/414 |
| 4,766,865 | 8/1988 | Hartel | 123/414 |

Primary Examiner—Tony M. Argenbright
Attorney, Agent, or Firm—Beveridge, DeGrandi & Weilacher

[57] ABSTRACT

An engine ignition timing control system comprises a camshaft angle sensor for detecting specific cam angles and outputting corresponding cam angle signals, a crankshaft angle sensor for detecting specific crank angles and outputting corresponding crank pulse signals, and a control unit for controlling the engine ignition timing on the basis of the cam angle signals and the crank pulse signals. The control unit has an engine starting detector, a crank pulse identifier for identifying at least two crank pulses on the basis of signals from the cam angle and crank angle sensors, a cyclic period calculator for determining the period corresponding to the angular speed of the crankshaft in accordance with said at least two crank pulses thus identified, and an ignition timing calculator. When the engine starting detector detects engine starting, an ignition signal is outputted in response to a signal from the cam angle sensor, and, when completion of starting is detected, an ignition timing is determined and an ignition signal is outputted by the ignition timing calculator in response to a signal from the crank angle sensor by way of the crank pulse identifier and the cyclic period calculator.

4 Claims, 5 Drawing Sheets

ENGINE IGNITION TIMING CONTROL SYSTEM

BACKGROUND OF THE INVENTION

This invention relates generally to internal combustion engines and ignition systems thereof and more particularly to control of ignition timing of such engines. More specifically, the invention relates to an engine ignition timing control system which detects data such as the cam angle or the crank angle from a reference position in an engine and, in response, sets the ignition or firing timing.

In the prior art, in an ignition control system of the time-control type utilizing crank angle signals of even pitch, the accuracy of the reference position detection is improved by the measure of counting the angle signals with standard angle signals as reference thereby to increase the number of pulses, as set forth, for example, in Japanese Laid-Open Patent Publication No. 36961/1979. Furthermore, as disclosed in Japanese Laid-Open Patent Publication Nos. 183304/1984 and 61617/1985, a measure, for this purpose, of setting specific pulse positions at particularly narrow settings is proposed. Another measure proposed in Japanese Laid-Open Patent Publication No. 47877/1985 comprises removal of one specific pulse position.

In the method of the reference cited first above Japanese Laid-Open Patent Publication No. 36961/1979, however, in the case where the number of pulses is increased, it is necessary to carry out a measure for preventing misfiring, whereby the improvement in accuracy is not as much as would be expected from the increase in the number of pulses. Furthermore, the hardware for processing these pulses entails an increase in cost, and, if the processing of the pulses is imposed on the software in order to avoid this increase in cost, the interrupted overhead becomes large, whereby many parts of the main control are occupied by the program for processing the pulse.

Furthermore, the latter of the above references (Japanese Laid-Open Patent Publication Nos. 183304/1984, 61617/1985, and 47877/1985) merely teach the use of means for carrying out cylinder identification and provide no contribution whatsoever to improvement of precision of ignition timing.

An ignition timing control of the time control method is accompanied by the problem of great irregularities in the ignition timing at the time of starting of the engine.

SUMMARY OF THE INVENTION

An object of this invention, which seeks to overcome the above described difficulties, is to provide an engine ignition timing control system of the time control type in which the accuracy of ignition timing is improved, and at the same time irregularities in ignition timing at the time of engine starting are prevented without increasing the load of the software and hardware of the system.

According to this invention, there is provided an engine ignition timing control system comprising a cam angle sensor for detecting specific cam angles and outputting corresponding cam angle signals, a crank angle sensor for detecting specific crank angles and outputting corresponding crank pulse signals, and a control unit for receiving as input signals from said sensors and controlling the engine ignition timing, and being characterized in that said control unit has an engine starting detection means for detecting the starting of the engine, a crank pulse identifying means for receiving as input signals from said cam angle sensor and said crank angle sensor and identifying at least two crank pulses, a cyclic period calculation means for determining the cyclic period corresponding to the angular speed of the crankshaft in accordance with said at least two crank pulses thus identified by said crank pulse identifying means, and ignition timing calculation means for calculating ignition timing, and in that, when said engine starting detection means detects the engine starting, an ignition signal is outputted in response to a signal from said cam angle sensor, and, when said engine starting detection means detects completion of the engine starting, an ignition timing is determined and an ignition signal is outputted by said ignition timing calculation means in response to a signal from said crank angle sensor by way of said crank pulse identifying means and said cyclic period calculation means.

In the ignition control system of the above described organization and functions, the inputting of the cam pulse signal from the cam angle sensor is set to be, for example, 10 degrees before the top dead center (TDC) of the crank angle, and the operations of (1) calculating, in the interval between crank pulses in which a cam pulse is not detected, the cyclic period which is the crank angular speed information, (2) calculating the ignition timing from the engine rotational speed calculated from this cyclic period and the intake pipe pressure, and (3) converting the result into the time from the crank pulse (reference signal) at the end of the cyclic period are carried out thereby to cause precise ignition. Moreover, at the time of engine starting, when the engine rotation becomes unstable, ignition signals are outputted with cam pulses of small fluctuations of cam angle as reference thereby to reduce the ignition timing fluctuations at the time of engine starting and achieve smooth engine starting.

The nature, utility, and further features of this invention will be more clearly apparent from the following detailed description when read in conjunction with the accompanying drawings, briefly described below.

DESCRIPTION OF THE PREFERRED EMBODIMENT

Figure 1:
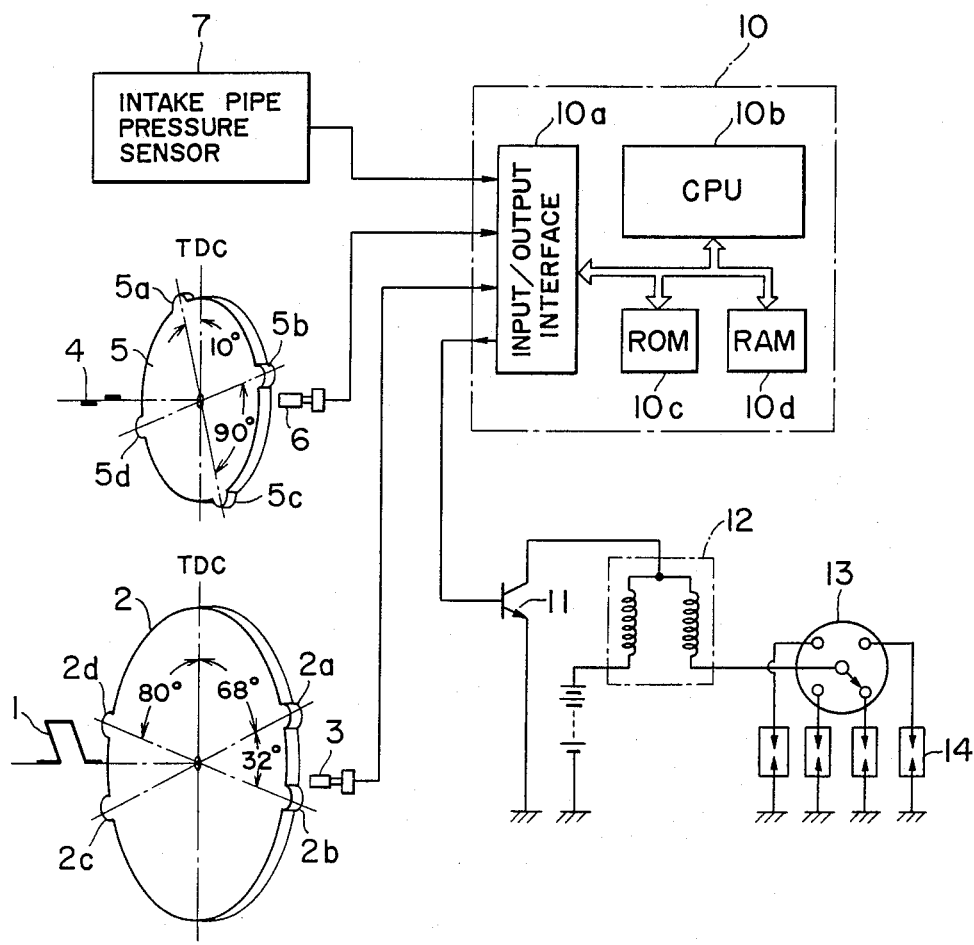
FIG. 1 is a combination of a schematic perspective view, a block diagram, and a circuit diagram showing the entire organization of one example of the engine ignition timing control system of this invention.

Referring first to FIG. 1, a crank plate 2 of disc shape for the purpose of detecting crank angular positions is fixed coaxially to the crankshaft 1 of an engine (not shown). Around the periphery of this crank plate 2, four projections 2a, 2b, 2c, 2d for generating pulses at specific angular positions of the crank angle are provided.

For example, projections 2a and 2c are set at 112 degrees before TDC, while projections 2b and 2d are set at 80 degrees before TDC. A crank angle sensor 3 is disposed to confront the periphery of the crank plate 2 so as to detect the projections 2a through 2d passing by as the crank plate 2 rotates and to generate corresponding crank pulse signals.

Separately, a disc-shaped cam plate 5 for detection of the cam angular position is fixed coaxially to a camshaft 4 of the engine which rotates once for every two revolutions of the crankshaft 1. Around its outer periphery, this cam plate 5 has four projections 5a, 5b, 5c and 5d spaced angularly at equal pitch intervals of 90 degrees for causing the generation of pulses at specific angular positions of the cam angle. These four projections 5a through 5d are thus provided, and a cam angle sensor 6 is positioned to confront the periphery of the cam plate 5 so as to classify the above mentioned crank angle pulses into two kinds, namely, pulses A (due to projections 2a and 2c) and pulses B (due to projections 2b and 2d) and to cause a cam pulse, which is to become a reference signal at the time of starting of the engine, to be generated, for example, at 10 degrees before TDC.

Figure 4:
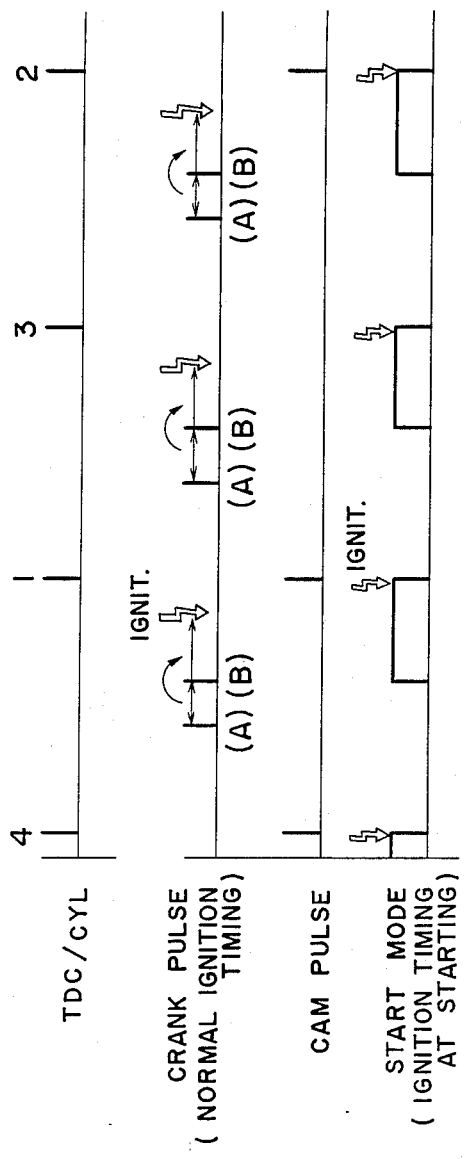
FIG. 4 is a time chart of crank pulses, cam pulses, and ignition timing.

These pulse signals from the crank angle sensor 3 and the cam angle sensor 6 are generated with timings as indicated in FIG. 4 and, together with the signal from an intake pipe pressure sensor 7 for detecting the pressure within the engine intake pipe, are inputted into a control unit 10 comprising microcomputers and operating to control ignition (firing or sparking) timing.

The engine (rotational) speed is calculated on the basis of the crank pulses from the crank angle sensor 3, and identification of cylinders is carried out on the basis of the cam pulses from the cam angle sensor 6. The control unit 10 comprises, essentially, an input/output interface 10a, a CPU 10b, a ROM 10c in which control programs and the like are stored, a RAM 10d for temporarily storing data, and the like and, according to a specific program, computes ignition timing. The resulting ignition signals are sent to a driving circuit 11 comprising power transistors and the like to switch this driving circuit from ON to OFF thereby to cause, by way of an ignition coil 12 and a distributor 13, an ignition voltage to be applied successively to spark plugs 14 of respective cylinders.

Figure 2:
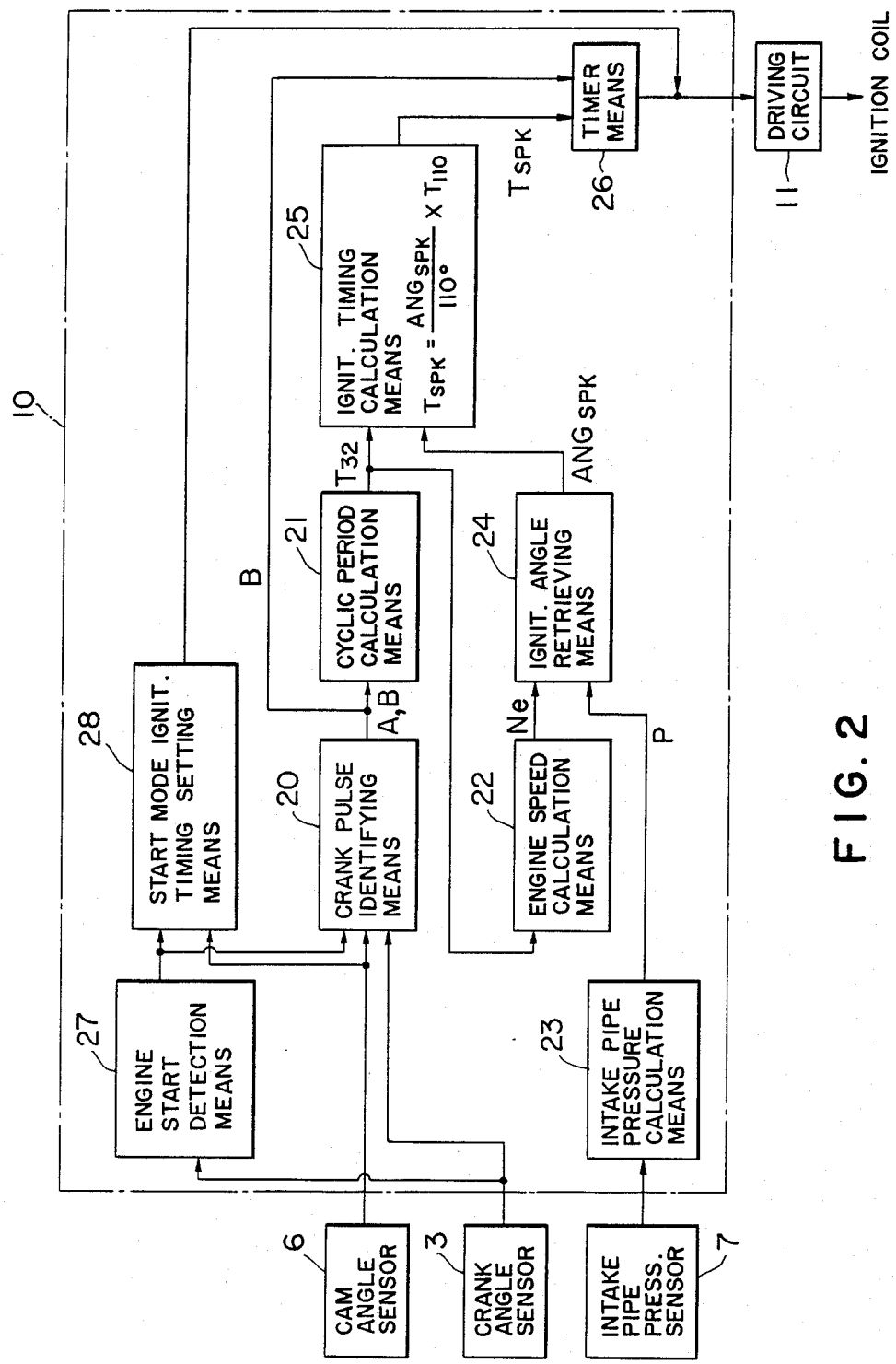
FIG. 2 is a block diagram of the principal electrical elements and their organization of the control system.
Figure 3:
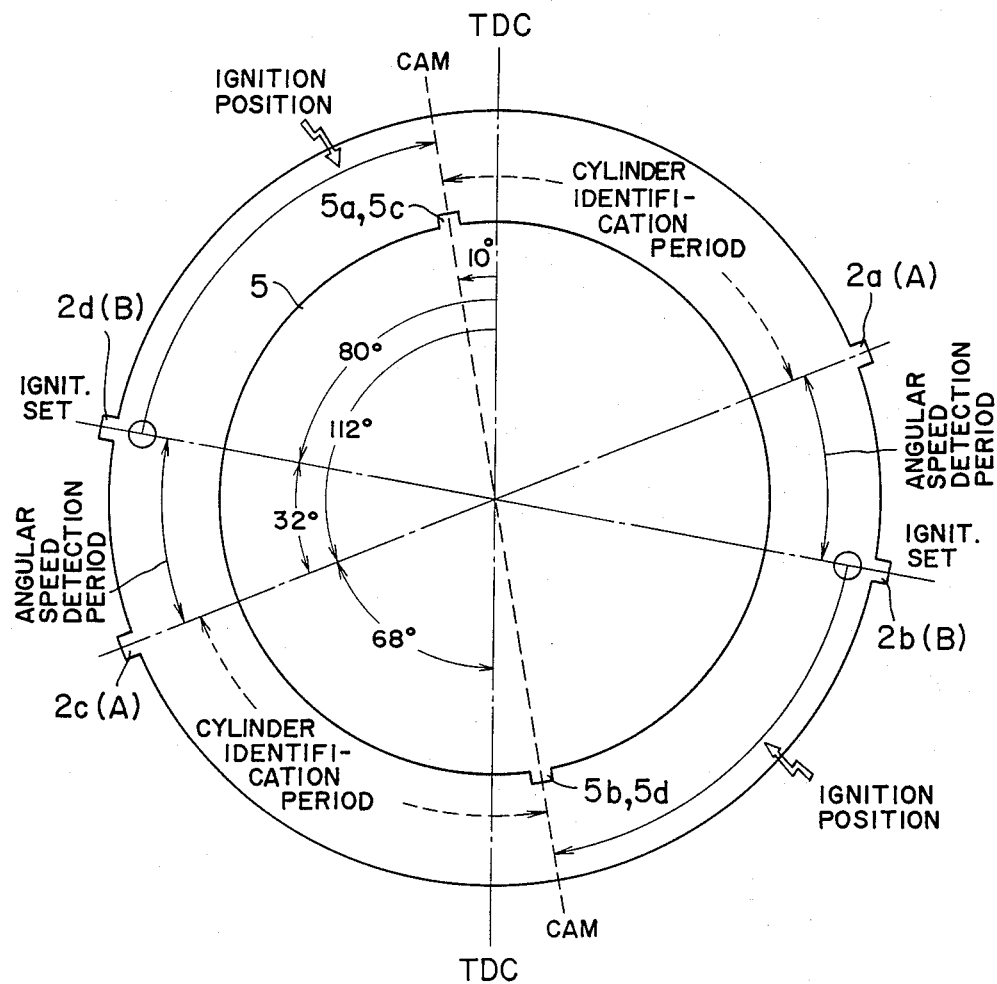
FIG. 3 is a diagram indicating detection positions of crank angle and cam angle.

The control unit 10 in one example thereof as shown in FIG. 2 has a crank pulse identifying means 20 which receives as input crank pulse signals and cam pulse signals from the crank angle sensor 3 and the cam angle sensor 6, respectively. On the basis of a cam pulse signal, this means 20 detects whether the cam pulse has been inputted between the preceding and the present (just past) crank pulses from the crank angle sensor 3. When a cam pulse signal has been inputted between the preceding and the present crank pulses, the crank pulse signal succeeding that cam pulse signal is identified as A (due to projection 2a or 2c), whereas when a cam pulse signal has been inputted, the next crank pulse signal is identified as pulse B (due to projection 2b or 2d).

The resulting output A is transmitted to a cyclic period calculation means 21 wherein cyclic period $T_{32}$, that is, angular speed information of the crankshaft 1 from the difference (32 degrees in this example) between the timing at which the crank pulse A was detected and the timing at which the immediately following crank pulse B was detected, is obtained. This angular speed information $T_{32}$ is fed to an engine (rotational) speed calculation means 22, which thereupon calculates the engine speed Ne.

Separately, the intake pipe pressure signal from the intake pipe pressure sensor 7 is received by an intake pipe pressure calculation means 23 which thus calculates the intake pipe pressure P corresponding to the engine load. On the basis of this pressure P and the engine speed Ne, an ignition angle retrieving means 24 determines the ignition angle, or angle of sparking, $ANG_{SPK}$ according to map retrieving for example, and transmits this as output to an ignition timing calculation means 25.

This ignition timing calculation means 25 determines the ignition timing THD SPK from the following equation (1) with the input reference ignition angle $ANG_{SPK}$ as the time interval from the timing the crank pulse B, indicating the reference position, was detected according to the cyclic period $T_{32}$, that is, the crank angular speed information.

$$T_{SPK}=(ANG_{SPK}/32°) \times T_{32} \tag{1}$$

The ignition timing $T_{SPK}$ thus determined is set in a timer means 26, which also receives the output of the crank pulse identifying means 20 and starts time counting according to the pulse signal B of the projection B identified by the crank pulse identifying means 20. Then, when the ignition or sparking timing $T_{SPK}$ thus set is reached, the timer means 26 transmits as output an ignition timing signal to the aforementioned driving circuit 11 to turn off the power transistor thereof and apply the ignition voltage to the spark plug 14 of the pertinent cylinder.

By this control operation, the signal of the projection B (2b, 2d) indicating the reference position approaches the actual ignition angle, whereby the ignition accuracy improves remarkably even under extreme conditions such as at the time of acceleration that the engine speed fluctuates greatly.

At the time of starting of the engine, the engine speed is low, whereby the cyclic period $T_{32}$ calculated in the cyclic period calculation means 21 becomes a relatively long period. Consequently the ignition angle $ANG_{SPK}$ also becomes long, and, moreover, fluctuations occur in the rotational speed also within one cycle. As a consequence, irregularities occur in the ignition timing, and smooth starting is not attained.

Accordingly, when the engine speed is below a preset speed (for example, 300 to 400 r.p.m.) as determined from the crank pulses from the crank angle sensor 3, an engine starting detection means 27 judges that the engine has started and generates a corresponding judgement signal by which the operations of the crank pulse identifying means 20 and the succeeding means are stopped. At the same time, a starting mode ignition timing setting means 28 also operates in response to this judgement signal to set the ignition timing with the cam pulse signal from the cam angle sensor 6 of relatively small fluctuation in the low-speed region as a reference and to output ignition (firing) signals directly to the driving circuit 11.

Then, when the engine speed has become higher than the above mentioned preset speed, the engine starting detection means 27 judges that the engine starting has been completed and outpus a starting completion signal, which stops the operation of the starting mode ignition timing setting means 28 and simultaneously starts the operations of the crank pulse identifying means 20 and the succeeding means. The control of the ignition timing is then carried out in accordance with the calculated ignition timing $T_{SPK}$.

By controlling the ignition timing in the above described manner, ignition lag or delay occurring at the time of engine starting can be reduced to a minimum. Furthermore, by appropriately setting the above described preset engine speed as the criterion for judgement of engine starting, when the ignition timing is similarly set on the basis of the cam pulses also at the time of idling, fluctuations of the ignition timing in the low-speed region can be reduced. At the same time, ignition timing can be controlled with only the cam signal also when an abnormality occurs in the crank angle sensor 3, whereby a "fail safe" measure is afforded.

Figures 5, 6:
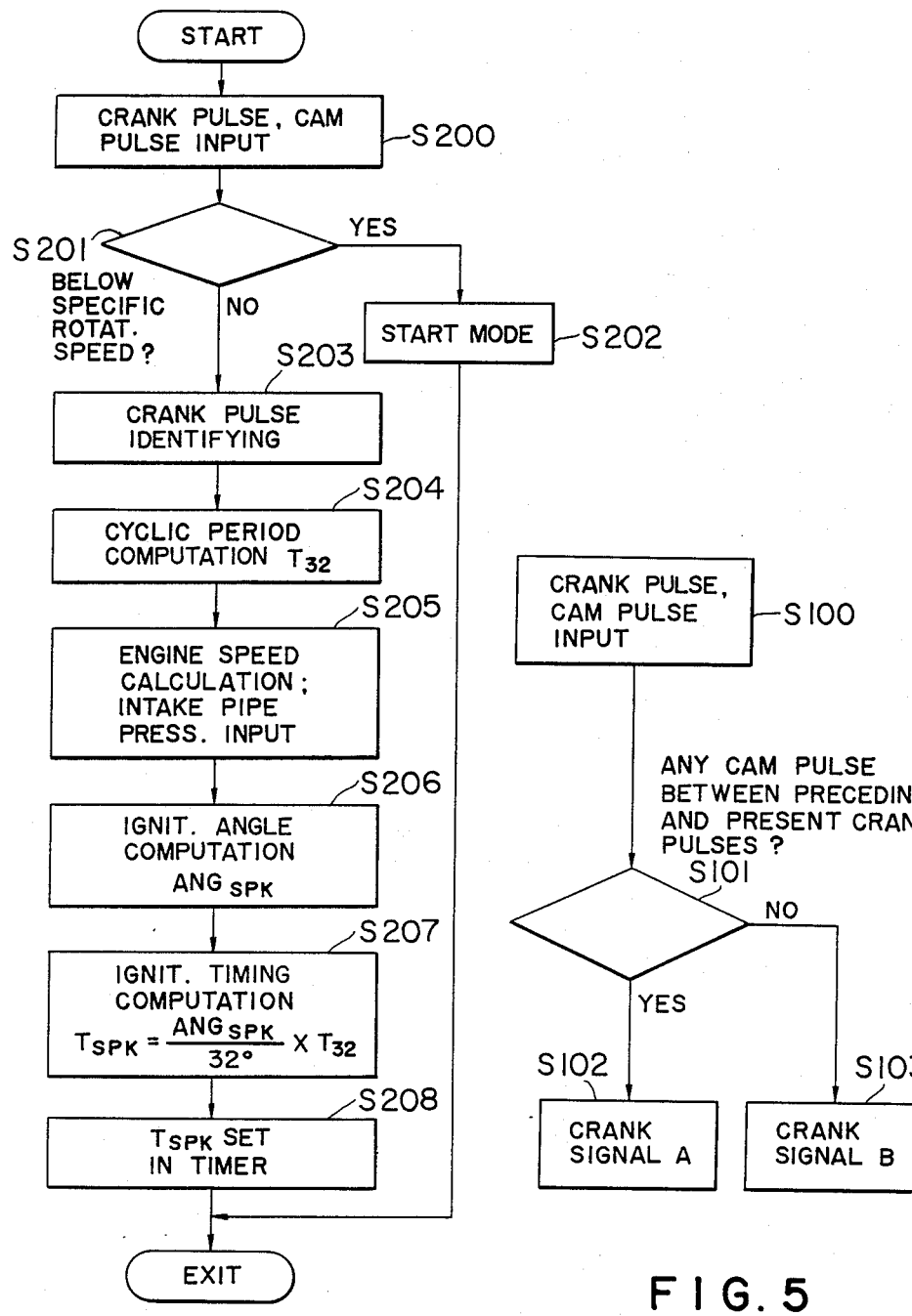
FIG. 5 is a flow chart indicating an operation for identifying crank pulses.
FIG. 6 is a flow chart indicating an operation for computing an ignition timing.

The above described operation will now be considered further with respect to flow charts as shown in FIGS. 5 and 6. Referring first to FIG. 5 indicating the crank pulse identifying operation, a crank pulse from the crank angle sensor 3 and a cam pulse from the cam angle sensor 6 are inputted in step S100. In the succeeding step S101, whether or not a cam pulse has been introduced as input between the preceding the present crank pulses is determined. If a cam pulse has been inputted, it is then judged in step S102 that the present crank pulse is due to a projection A, whereas if a cam pulse has not been inputted, it is judged in step S103 that the present crank pulse is due to a projection B, that is, that it is a reference signal.

Then, in the ignition timing calculation operation as indicated in FIG. 6, a crank pulse and a cam pulse are first inputted in step S200. Then, in step S201, whether or not the engine speed is below the preset speed is determined.

Then, when the engine speed is below the preset speed, and it is judged that the engine is starting, the system assumes the starting mode in step S202. A crank pulse B then causes electric power supply to the ignition coil 12 to start, and ignition is carried out with a cam pulse at 10 degrees before TDC. Ignition timing lag is kept at a minimum even in the low-speed region in which fluctuations in engine speed tend to be large.

When, upon completion of engine starting, it is judged in step S201 that the engine speed is higher than the preset speed, identifying of the crank pulses A or B is carried out as indicated in FIG. 6 in step S203. In step S204, the period $T_{32}$ from crank pulse A to pulse B, that is, crank angular speed information, is calculated. In step S205, on the basis of this crank angular speed, the engine speed Ne is calculated, and at the same time, the intake pipe pressure P indicating the engine load is read. From these data, the ignition angle $ANG_{SPK}$ is determined in step S206 by a method such as retrieving means.

Furthermore, in step S207, the ignition timing $T_{SPK}$ is determined from Equation (1) and is set in the timer means 26 in step S208. Thereafter, as described hereinbefore, when the firing timing $T_{SPK}$ is reached, the timer means 26 outputs an ignition signal. This operation is repeated every half revolution of the crankshaft, whereby the spark plugs 14 of all cylinders are successively fired.

As described above with respect to one example, this invention provides an engine ignition timing control system in which a cyclic period to become crank angle information is determined in the interval between crank pulses during which a cam pulse is not detected, and the ignition timing is calculated on the basis of this cyclic period and converted into an ignition timing. Then, when this timing is reached, an ignition signal is outputted. By this ignition timing control, it becomes possible to bring the reference position nearer to the actual ignition position, and the accuracy of the ignition timing control during normal operation is greatly improved.

Furthermore, the irregularities in the ignition timing occurring in the low-speed region of the engine operation such as starting or idling, which has been a problem accompanying ignition timing control of the time control method, are suppressed without increasing the load on the hardware and the software, and engine starting can be carried out smoothly.

In addition, the invention affords other advantages such as the "fail safe" feature of the possibility of carrying out ignition by means of cam pulses even when an abnormality or a malfunctioning occurs in the crank angle sensor.

What is claimed is:

1. An engine ignition timing control system having a cam angle sensor for detecting specific cam angles and outputting corresponding cam angle signals, a crank angle sensor for detecting specific crank angles and outputting corresponding crank pulse signals, and a control unit for receiving as input signals from said sensors and controlling the engine ignition timing, said control unit comprising an engine starting detection means for detecting the starting of the engine, a crank pulse identifying means for receiving as input signals from said cam angle sensor and said crank angle sensor and identifying at least two crank pulses, a cyclic period calculation means for determining the cyclic period corresponding to the angular speed of the crankshaft in accordance with said at least two crank pulses thus identified by said crank pulse identifying means, and ignition timing calculation means for calculating ignition timing, whereby, when said engine starting detection means detects the engine starting, an ignition signal is outputted in response to a signal from said cam angle sensor, and, when said engine starting detection means detects completion of the engine starting, an ignition timing is determined and an ignition signal is outputted by said ignition timing calculation means in response to a signal from said crank angle sensor by way of said crank pulse identifying means and said cyclic period calculation means.

2. The engine ignition control system according to claim 1 wherein said control unit further comprises a starting mode ignition timing setting means which operates in response to a judgement signal to set the ignition timing with the cam pulse signal from the cam angle sensor of relatively small fluctuation in the low-speed region as a reference and to output ignition signals directly to a driving circuit.

3. The engine ignition control system according to claim 1 wherein said control unit further comprises an intake pipe pressure calculation means which calculates the intake pipe pressure corresponding to the engine load and outputs the intake pipe pressure therefrom.

4. The engine ignition control system according to claim 3 wherein said control unit further comprises an ignition angle retrieving means which determines from the intake pipe pressure and the engine speed the reference ignition angle $ANG_{SPK}$ according to map retrieving and transmits this as output to the ignition timing calculation means.

* * * * *